United States Patent [19]

Hill

[11] 4,121,721
[45] Oct. 24, 1978

[54] APPARATUS FOR HANDLING AND STORING ELONGATED ARTICLES

[75] Inventor: William J. Hill, Holden, Mass.

[73] Assignee: Morgan Construction Company, Worcester, Mass.

[21] Appl. No.: 761,834

[22] Filed: Jan. 24, 1977

[51] Int. Cl.² ............................................. B65G 37/00
[52] U.S. Cl. .................... 214/1 P; 214/1 BB; 198/774
[58] Field of Search ............... 214/1 P, 1 R, 1 PA, 214/DIG. 4, 1 BB, 1 PB, DIG. 1, DIG. 3; 198/750, 774

[56] References Cited

U.S. PATENT DOCUMENTS

| | | | |
|---|---|---|---|
| 3,084,787 | 4/1963 | Moseley | 198/774 |
| 3,581,880 | 6/1971 | Iversen | 198/774 |
| 3,726,463 | 4/1973 | Hoffmann et al. | 214/1 P X |
| 3,917,078 | 11/1975 | Schmidt | 214/1 P |
| 4,002,248 | 1/1977 | Moller | 214/1 P |

FOREIGN PATENT DOCUMENTS 165,293 11/1964 U.S.S.R. .................................. 214/1 P

Primary Examiner—Frank E. Werner
Attorney, Agent, or Firm—Thompson, Birch, Gauthier & Samuels

[57] ABSTRACT

An apparatus for handling and storing elongated articles comprises a plurality of parallel article support members or skids arranged in a horizontal plane to define a storage area having a receiving side from which the skids extend laterally. A plurality of transfer cars are located between the skids beneath the aforesaid horizontal plane. The transfer cars are aligned in a direction perpendicular to the skids and are moved in unison towards or away from the receiving side of the storage area by a common drive. Each transfer car carries a set of article elevating members with each set being adjustable individually between a lowered inoperative position beneath the plane of the skids and a raised operative position protruding thereabove.

6 Claims, 8 Drawing Figures

APPARATUS FOR HANDLING AND STORING ELONGATED ARTICLES

DESCRIPTION OF THE INVENTION

This invention relates generally to material handling apparatus, and is concerned in particular with a transfer and storage apparatus for use in a rolling mill in the handling of elongated articles such as for example bundles of rolled bar products. Such bundles normally vary in length from a minimum of approximately 10 feet to a maximum of approximately 60 feet. The bundles also vary considerably in the number and size of the bars contained therein. This in turn affects the cross sectional area and longitudinal stiffness of the bundles, some having large cross sections and being relatively stiff while others have relatively small cross sections and are limber or flexible.

The bundles are normally densely packed and tied with straps, wires or the like, interconnected by seals. Tags are applied to the bundles to identify the type and size of the product contained therein. Preferably, the seals and tags are located at the tops of the bundles where they are least likely to become damaged and where they can be readily observed by operating personnel. Also, the ends of the straps normally have sharp ends which are best kept at the bundle tops where they are least likely to cause injury to operating personnel.

An object of the present invention is the provision of a material handling apparatus which has the ability to efficiently handle elongated articles varying widely in length, and to store such articles efficiently in a relatively compact storage area.

Another object of the present invention is to provide a material handling apparatus which has the capability of handling elongated articles varying widely in cross sectional area and longitudinal stiffness.

A further object of the present invention is to provide a material handling apparatus which is capable of lifting, transporting and subsequently storing elongated articles without rolling or turning the said articles.

A still further object of the present invention is to provide a material handling apparatus which minimizes the power requirements for handling elongated articles of widely varying lengths.

These and other objects and advantages of the present invention will become more apparent as the description proceeds with the aid of the accompanying drawings, wherein.

Figure 1:
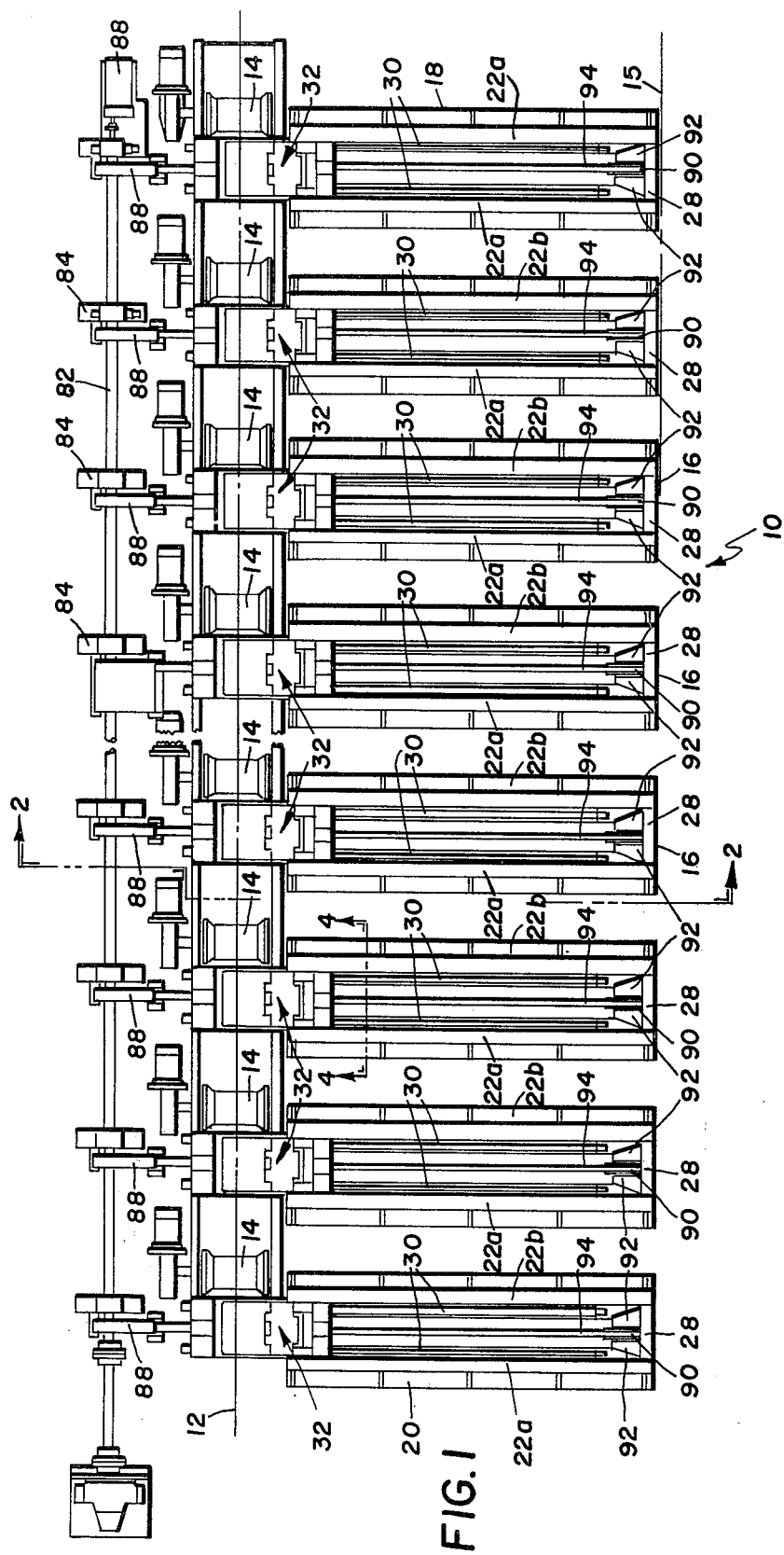
FIG. 1 is a plan view of a preferred embodiment of an apparatus embodying the concepts of the present invention.

Referring now to the drawings, wherein like reference numerals designate the same parts throughout the several views, there is generally indicated at 10 a storage and transfer apparatus embodying the concepts of the present invention. The apparatus 10 encompasses a generally rectangular storage area having a receiving side which is aligned with the delivery axis 12 of a conventional roller table having a plurality of individually driven table rollers 14. The opposite side 15 of the storage area is defined by the aligned ends of peninsula-shaped extensions indicated typically at 16. The storage area also has a front end 18 and a rear end 20.

Figure 4:
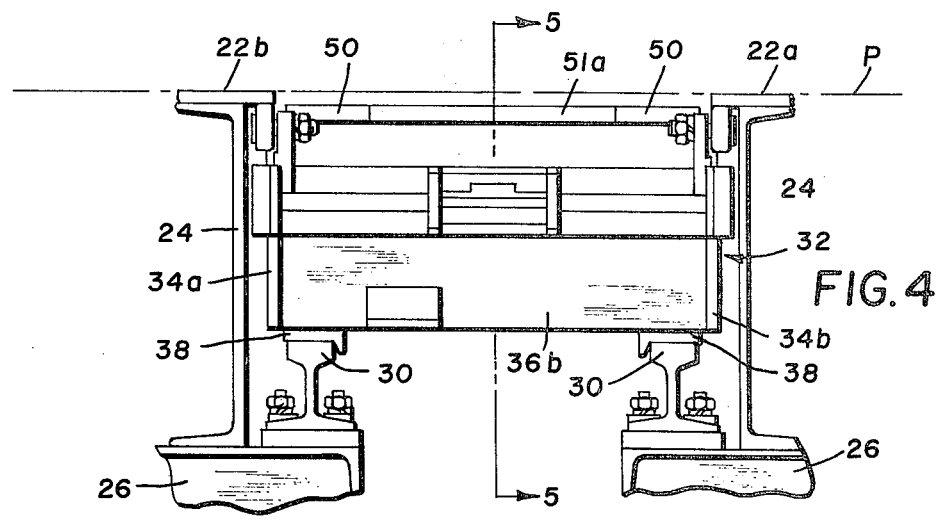
FIG. 4 is a sectional view on an enlarged scale taken along lines 4—4 of FIG. 1 and showing an end view of a transfer car.

Each extension 16 includes a pair of parallel article support members or skids 22a, 22b supported on heavy channel section 24 (See FIG. 4) which are in turn mounted on laterally spaced foundation pedestals 26. The channel sections 24 are interconnected on the side of the storage area opposite to that of the delivery side 12 by means of transverse channel braces 28. The skids 22a, 22b are all located in a common horizontal plane P (see FIG. 4), and they extend laterally from the receiving side 12 of the storage area.

A pair of rails 30 is located between each pair of channel sections 24. The rails 30 are also supported on the foundation pedestals 26 at a level beneath that of the plane P of the support skids 22a, 22b.

A transfer car generally indicated at 32 is located between each pair of channel sections 24. Each transfer car has a box-like chassis with side walls 34a, 34b and end walls 36a, 36b. The side walls 34a, 34b have axles extending therebetween on which are mounted wheels 38 arranged to run along the rails 30.

Figure 5:
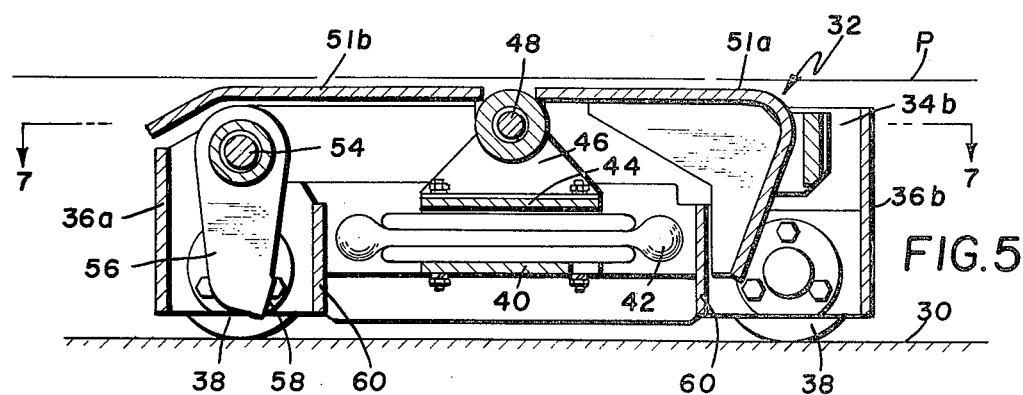
FIG. 5 is a sectional view taken along lines 5—5 of FIG. 4.
Figure 3:
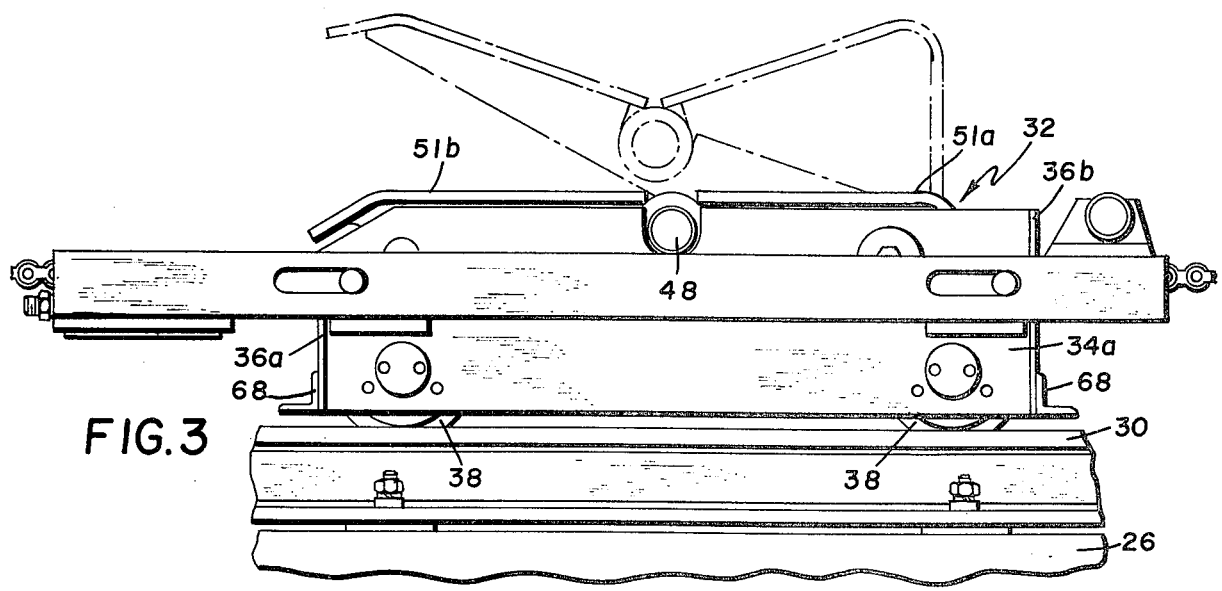
FIG. 3 is an enlarged side elevation of a transfer car with its article elevating members shown in solid and dot-dash lines respectively in their lowered and raised positions.
Figure 6:
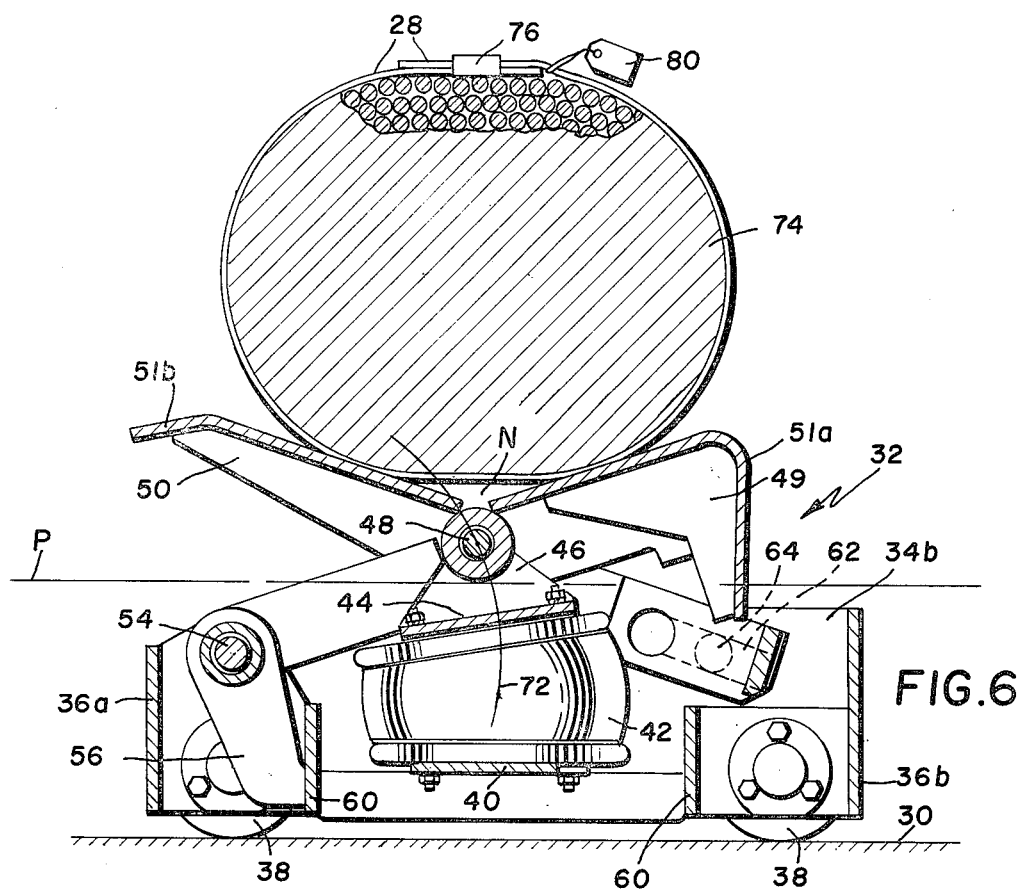
FIG. 6 is a sectional view similar to FIG. 5 showing the article elevating members in their extended operative position supporting a bundle of bar products above the plane of the support skids.
Figure 7:
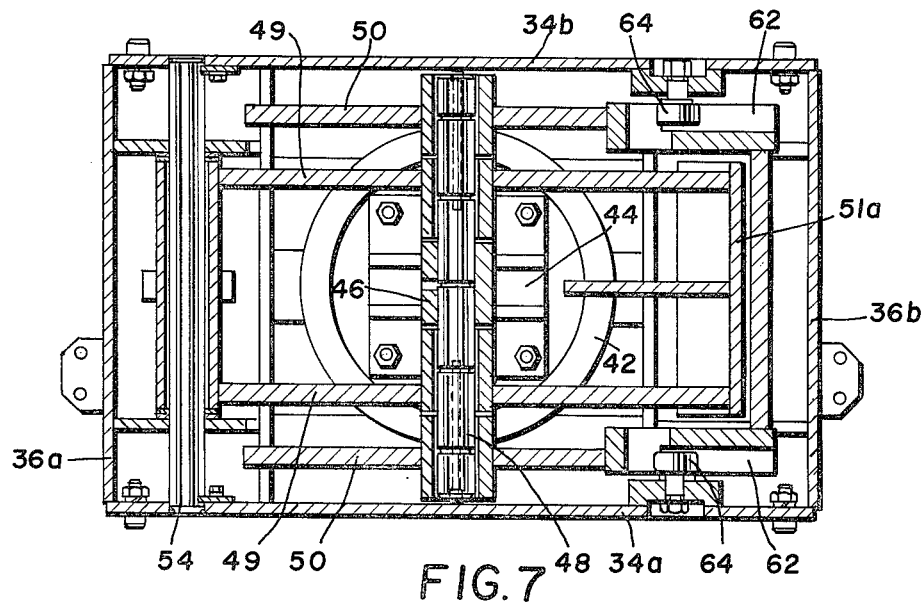
FIG. 7 is a sectional view taken along line 7—7 of FIG. 5.

As is best shown in FIGS. 5-7, each transfer car 32 further comprises a support plate 40 which extends transversely between the side members 34a, 34b and on which is mounted an inflatable bag 42. The bag 42 in turn carries an upper plate 44 having an upstanding bracket 46 supporting a shaft 48.

The shaft 48 is pivotally connected to the mid-sections of a pair of inner levers 49 arranged between outer levers 50. The inner levers 49 are interconnected by a support surface 51a, as are the outer levers 50 by another support surface 51b. The levers 49 are mounted for pivotal movement about a shaft 54 which extends transversely between the side walls 34a, 34b of the transfer car. Levers 49 further include depending legs 56 having toes 58 disposed oppositely to one of the transverse braces 60 extending between the car side walls 34.

The levers 50 each have outwardly facing side slots 62 which receive guide rollers 64 supported on the transfer car side walls 34a, 34b.

Figure 2:
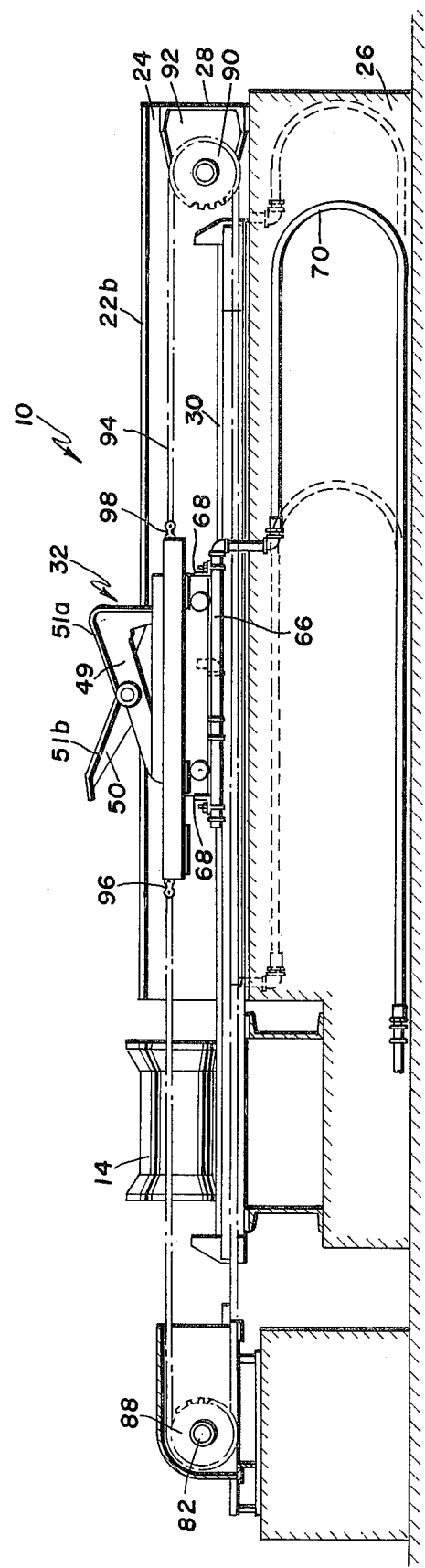
FIG. 2 is a sectional view on an enlarged scale taken along lines 2—2 of FIG. 1, showing a transfer car being advanced away from the receiving side of the storage area with its article elevating members in the raised operative position.

As is best shown in FIG. 2, each inflatable bag 42 is connected by means of a compressed air line having a rigid section 66 underlying the transfer car 32 and attached thereto by brackets 68, and a flexible section 70 which extends between the foundation pedestals 26 back towards the delivery side 12 of the storage area. Although not shown, it will be understood that the flexible compressed air lines 70 of each transfer car 32 are hooked into an appropriate control arrangement which allows each air bag 42 to be individually controlled.

As shown in FIG. 5, when an air bag 42 is deflated, the levers 49–50 are in their lowered inoperative positions retracted beneath the plane P of the support skids 22. Inflation of the bag 42 moves the bracket 46 and its shaft 48 upwardly along an arc schematically depicted in FIG. 6 at 72. This causes the levers 49 and their support surface 51a to pivot upwardly about shaft 54 until the noses 58 engage the opposed brace 60. At the same time, the levers 50 and their support surface 51b undergo combined pivotal and axial movement due to the cooperative arrangement of the guide rollers 64 in the slots 62. The net result is illustrated in FIG. 6 where it can be seen that the support surfaces 51a, 51b are elevated above the plane P of the support skids 22 to form a notch generally indicated at N. Thus, when a transfer car 32 is located beneath an elongated article such as for example a round bundle 74 of bar products, inflation of the bag 42 will cause the overlying section of the bundle to be confined by the notch N while being elevated above the plane P of the support skids 22a, 22b.

The confining action of the notch N prevents the bundle 74 from rolling, and thus insures that the strap seals 76 and the sharp ends of the straps 78 remain at the top of the bundle 74. The identification tags 80 also remain at the tops of the bundles where they are in full view of operating personnel.

As is best shown in FIG. 1, the transfer cars 32 are aligned in a direction perpendicular to the parallel pairs of support skids 22a, 22b.

The transfer cars 32 are moved in unison towards and away from the receiving side 12 by an operating means which includes a line shaft 82 supported at spaced locations by bearings 84 and rotatably driven by means of a single drive motor 86. A plurality of sprockets 88 are mounted on the line shaft 82 for rotation therewith, there being one sprocket 88 for each transfer car 32. Idler sprockets 90, again one for each transfer car 32, are rotatably mounted between brackets 92 extending inwardly from the transverse channel braces 28 which interconnect the channel sections 24. A chain 94 is connected at one end as at 96 to the transfer car 32 and extends therefrom around driven sprocket 88 then back in an opposite direction under the transfer car where it is passed around the idler sprocket 90 before returning to have its opposite end connected to the transfer car as at 98.

It will thus be seen that by operating the single drive motor 86 to rotate the line shaft 82 in one direction, for example the clockwise direction as viewed in FIG. 2, all of the transfer cars 32 will be moved in unison away from the delivery side 12 of the storage area. By the same token, reverse rotation of the line shaft 82 will cause the transfer cars 32 to move in the opposite direction towards the receiving side 12.

The operation of the apparatus will now be reviewed. Elongated articles such as for example bundles 74 of bar products, are carried longitudinally by the driven table rollers 14 to a desired position along the receiving side 12 of the storage area. The extent to which each bundle is advanced will of course be governed by a number of factors, including its overall length and the section of the storage area to which the bundle is to be subsequently transferred laterally. The transfer cars 32 with their bundle elevating levers retracted, are located beneath the bundle on the roller table. This location of the transfer cars can take place prior to, during, or subsequent to the arrival of the bundle, since transverse movement of the cars can occur entirely beneath the plane P of the transfer skids and the support surfaces of the table rollers 14. Thereafter, depending on the length of the bundle and its inherent rigidity, the air bags 42 of an appropriate number of transfer cars are inflated, thereby raising the support surfaces 51a, 51b associated therewith. This results in the bundle being elevated above the table rollers 14 and the plane P of the support skids. Since the air bags 42 are individually inflatable, only a minimum required number need be employed to elevate a given bundle. Where short bundles are being handled, this makes it possible to conserve power which might otherwise be wasted. Once a bundle has been elevated, the drive motor 86 is energized to rotate the line shaft 82 in a clockwise direction as viewed in FIG. 2. This causes the elevated bundle to be moved laterally to the desired location in the storage area. While the bundle is moving laterally, it is safely confined in the notches N and is thus prevented from rolling. As previously mentioned, this is advantageous in that it keeps the strap seals 76 at the top of the bundle where they are least likely to be damaged. Also, when at the top of the bundle, the identification tags 80 are visible to operating personnel and the sharp ends of the straps 78 are least likely to inflict injuries. When the bundle arrives at the appropriate location in the storage area, the inflated air bags are simply deflated and this in turn results in the bundle being gently deposited on the skids 22a, 22b. Thereafter, the transfer cars can be returned beneath the level of the support skids to pick up another bundle from the roller conveyor.

Figure 8:
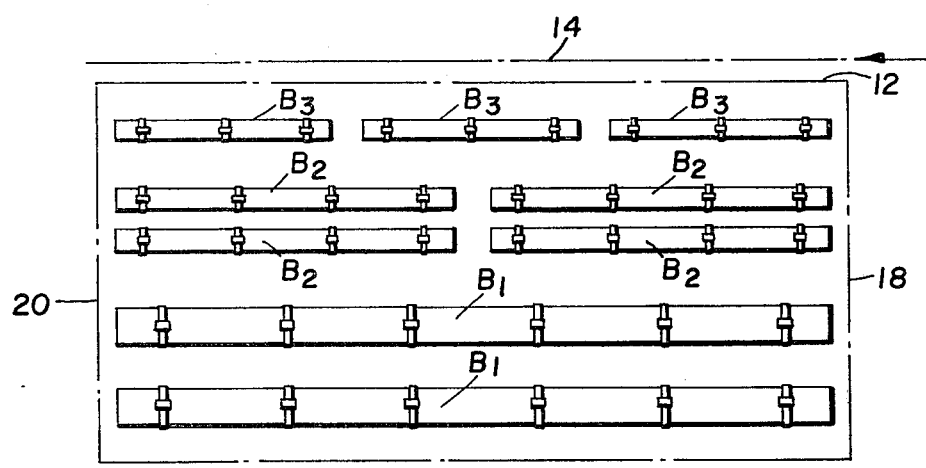
FIG. 8 is a schematic plan view of the apparatus illustrating how it can be employed to store elongated articles of varying lengths.

With reference to FIG. 8, it will thus be seen that with the above described arrangement, a given storage area can be efficiently utilized to store a wide range of bundle sizes with a minimum need for supervision by operating personnel. For example, relatively long bundles $B_1$ can be transferred and stored by employing all of the transfer cars. Smaller bundles $B_2$ can be transferred by using a lesser number of cars and these bundles can be aligned end-to-end, or staggered, as desired. Other still shorter bundles $B_3$ can be initially placed near the receiving end 12 and thereafter advanced laterally as other sections of the storage area are unloaded by conventional means, such as for example overhead cranes.

It is my intention to cover all changes and modifications of the preferred embodiment herein chosen for purposes of disclosure which do not depart from the spirit and scope of the invention.

I claim:

1. Apparatus for handling elongated articles comprising: a plurality of laterally spaced fixed article support members defining a storage area, the upper surfaces of said support members being arranged in a common plane; fixed rails parallel to said support members, said rails being located beneath said plane and between said support members; a plurality of transfer cars carried on said rails, said transfer cars being aligned laterally in a direction perpendicular to said support members and being located beneath said plane; first and second pivotally interconnected levers on the chassis of each of said transfer cars; a single drive means connected to a plurality of said transfer cars for moving said transfer cars simultaneously along said fixed rails, and, separately operable elevating means for vertically adjusting the first and second levers of each transfer car between lowered inoperative positions at which said levers are essentially parallel and beneath said plane and raised operative positions at which said levers are arranged angularly to each other to form an upwardly facing notch in which an elongated article is supported at a level above that of said plane.

2. The apparatus of claim 1 wherein said drive means is comprised of a rotatable drive shaft extending in a direction perpendicular to said article support members, means for rotating said drive shaft in opposite directions, drive sprockets mounted on said drive shaft for rotation therewith, there being one drive sprocket for each transfer car, an idler sprocket associated with each drive sprocket, and chain means connected to each transfer car and extending around one of said drive sprockets and one of said idler sprockets for imparting motion to said transfer cars in response to rotation of said drive shaft.

3. The apparatus of claim 2 wherein said drive shaft is located at the receiving side of the storage area and the idler sprockets are located at the opposite side of the storage area.

4. The apparatus of claim 1 wherein said elevating means comprises inflatable members carried on said transfer cars and engageable with said article elevating members.

5. The apparatus of claim 1 wherein said first levers are pivotally connected at a first location to said chassis and at a second location to said second levers, said second levers in turn being pivotally connected to and movable longitudinally relative to said chassis at a third location, said elevating means being connected to said first and second levers at said second location and being operative to vertically adjust said second location relative to said chassis.

6. The apparatus of claim 5 wherein said elevating means is comprised of an inflatable member located between said second location and the chassis of said transfer car.

* * * * *